INVENTORS
Ersel A. Evans
Robert J. Anicetti
William E. Rouke Attorney INVENTORS
Ersel A. Evans
Robert J. Anicetti
William E. Roake United States Patent Office 2,977,297
Patented Mar. 28, 1961

2,977,297

REACTOR FUEL ASSEMBLY

Ersel A. Evans, Robert J. Anicetti, and William E. Roake, Richland, Wash., assignors to the United States of America as represented by the United States Atomic Energy Commission Filed Sept. 2, 1958, Ser. No. 758,632

4 Claims. (Cl. 204—193.2)

This invention relates to nuclear reactors, and more particularly it relates to fuel assemblies for pressure tube type, power reactors operable at high temperatures. A particular nuclear reactor for which use of this invention is advantageous is a plutonium recycle, thermal, heterogeneous, power reactor hereinafter described in detail.

Plutonium is a by-product of almost all nuclear power reactors. The fertile isotope of uranium, U-238, is transformed into plutonium by neutron absorption. Some of this plutonium is fissioned, in situ, to add its energy to that of the U-235. Even in the most efficient reactor, however, at least 25% of the plutonium generated is discharged unburned in the spent fuel element. Unless this plutonium is economically used it will be difficult, if not impossible, to bring down the overall cost of nuclear power to a level competitive with fossil fuel generated power.

Investment and operating costs of nuclear power reactors can be considerably reduced by taking advantage of the use of enriched fuels. Enrichment makes it possible to use ordinary water in the nuclear reactor and use the common structural materials within the reactor core as well as reduce the reactor size and rating considerably below that required for natural uranium. Even in large reactors enrichment may be used to increase design flexibility and cycle economy through extended exposures and neutron flux flattening or leveling.

Plutonium recycle is, in the broad sense, simply the use of plutonium recovered from spent uranium fuel elements to provide a part of the fissile material requirements of a subsequent reactor loading. After initial enrichment with U-235 or Pu-239 a reactor may produce sufficient plutonium which, upon reprocessing, can be used as a source of enrichment for the second cycle. Repeated cycles of this type can be continued indefinitely without further addition of enrichment to the system. Natural uranium, and even uranium depleted in the U-235 isotope may be used as the feed material in subsequent loadings. Thus, a power reactor may be continuously operated using enriched fuel without resorting to the expensive isotope separation systems as are presently being used.

Since the plutonium recycle concept is applicable primarily to power producing reactors, it is required that optimum provisions be made for the extraction of power. Reactors produce their power in the form of nuclear fission heat which must be transformed to electrical energy. It is therefore requisite that the heat produced be extracted in a most efficient manner. The design of the fuel assemblies containing the fissionable material plays a major part in the extraction of heat therefrom. It is therefore an object of this invention to provide a fuel assembly for high temperature, power reactors which facilitate the efficient extraction of heat energy.

Fuel assemblies presently being used in power reactors are generally in the form of bundles of parallel rods or plates. Each rod or plate is clad in a metal sheath which protects the fuel material from corrosion and helps to contain the fission products. The metal sheaths, however, tend to absorb neutrons which are thus lost to fissioning processes of the reactor. It is therefore another object of this invention to provide a fuel assembly which has a substantially greater ratio of weights of fissionable material to sheathing material or cladding.

For safety in operation it is advantageous for a thermal reactor to experience a negative reactivity effect upon loss of coolant flow. The design of the fuel assembly may contribute to the desired effect. It is, therefore, another object of this invention to provide a fuel assembly which is more fail-safe upon accidental loss of coolant.

Other objects and advantages of this invention will become apparent upon a further reading of this specification especially when read with reference to the accompanying drawings in which.

The objects and advantages of this invention are best practiced in a fuel assembly having a solid cylindrical central element in a metallic sheath or cladding having radially spaced ribs extending outwardly therefrom, a first tubular element concentrically surrounding the central element and housed in a metallic sheath having a plurality of outwardly extending radially spaced ribs, and a second tubular element concentrically surrounding said first tubular element housed in a metallic sheath having outwardly extending radially spaced ribs, said solid central element and said first and second tubular elements each fabricated of neutron fissionable material.

The nuclear reactor as shown on the attached drawings is part of the testing facility designed to advance the knowledge and techniques of the plutonium recycle power reactor program. It is a vertical, pressure tube type, reactor, heavy water moderated and cooled, with a thermal power rating of approximately 70 megawatts. The reactor forms a part of a test facility which comprises, in addition, remotely controlled fuel handling equipment, plutonium extraction means and fuel assembly fabrication means.

REACTOR SHELL AND MODERATOR TANK

Figure 1:
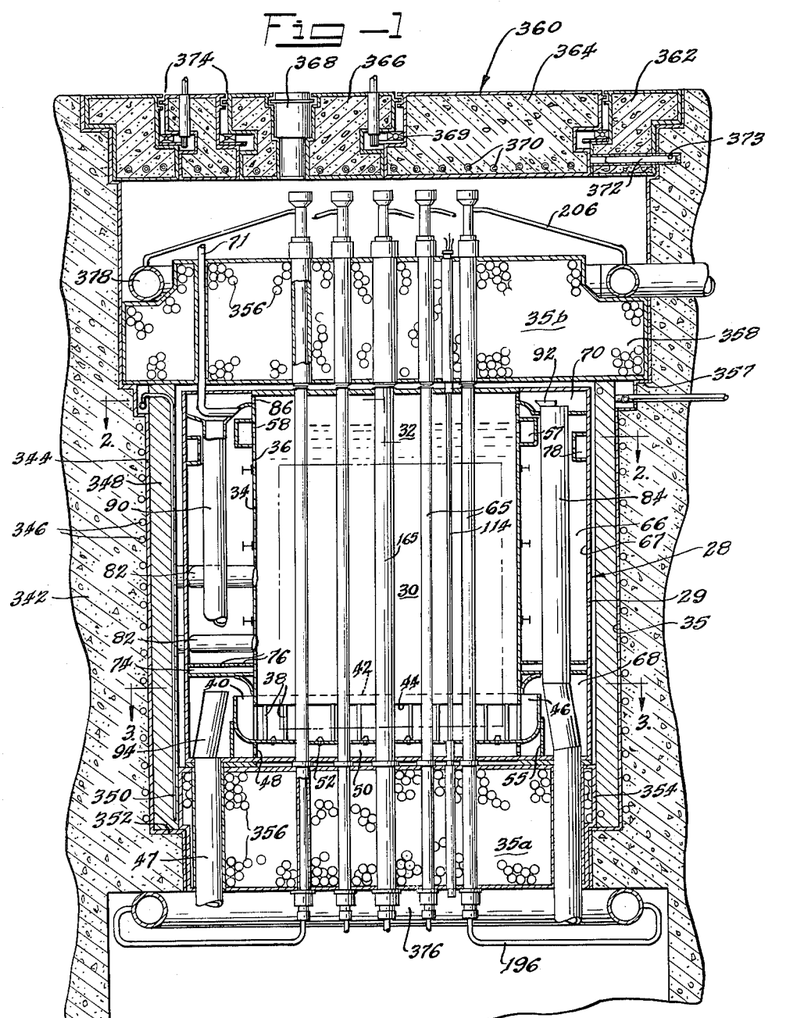
Fig. 1 is a vertical section view of the reactor.
Figure 2:
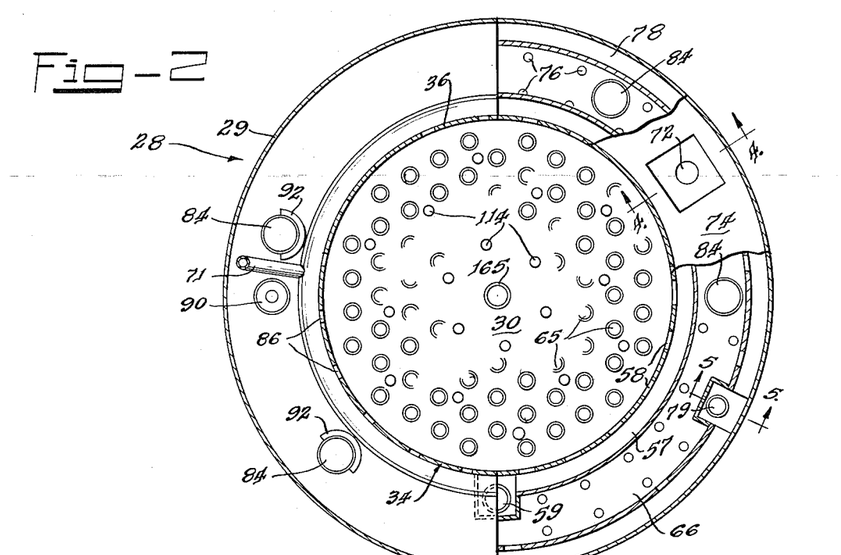
Fig. 2 is a horizontal section view taken along the line 2—2 of Fig. 1.
Figure 3:
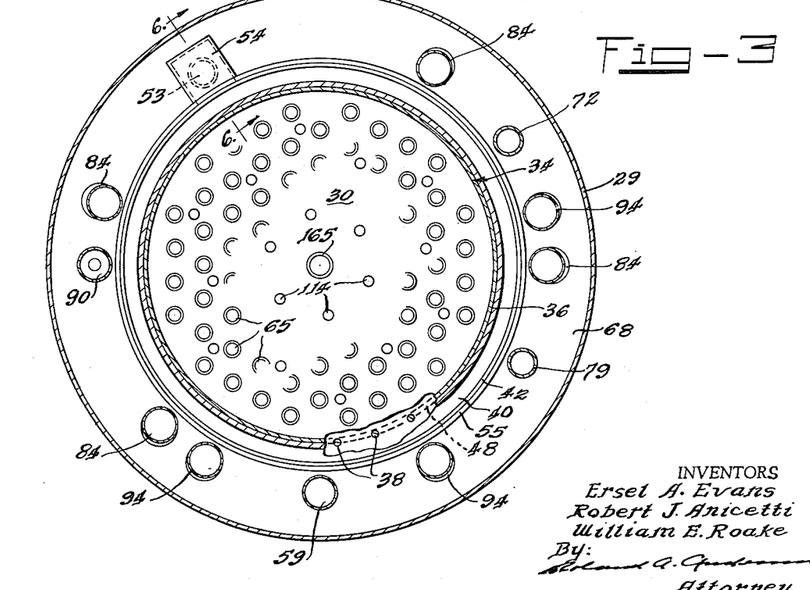
Fig. 3 is a horizontal section view taken along the line 3—3 of Fig. 1.

As seen in Figs. 1–3, the reactor 28 comprises a sealed, aluminum reactor shell 29 housing an active portion 30 submerged in a heavy water moderator 32, contained in a cylindrically shaped tank 34. The reactor 28 is housed in a cylindrical concrete cell 35, resting on a bottom primary shield 35a and covered by a top primary shield 35b as hereinafter described.

The moderator tank 34 comprises a ½" thick aluminum cylinder 36 having a 7' inner diameter and 8' 2" high. The cylinder 36 is supported in an axially vertical position by means of 24 circularly arranged tubes 38 stationed upright within a dish shaped, aluminum member 40 forming the bottom of the moderator tank 34. It will be noted in Fig. 1 that the upper edge 42 of the dish shaped bottom 40 is positioned approximately 3" above the lower end 44 of the cylinder 36 thereby forming a water trapped weir 46 through which feedwater moderator 32 may escape the tank 34. Feedwater moderator drains from the reactor shell through an 8" drain line 47 extending downward through the bottom primary shield 35a.

The moderator tank 34 is supported concentrically within the shell 29 by means of a circular wall 48 engaging the dish bottom 40 of the moderator tank 34 and the bottom of the reactor shell 29. The chamber 50 formed by the moderator tank bottom 40, the circular wall 48 and the bottom of the shell 29 serves as a plenum for the heavy water moderator which flows upward therefrom through nozzles 52 into the moderator tank 34.

Figure 6:
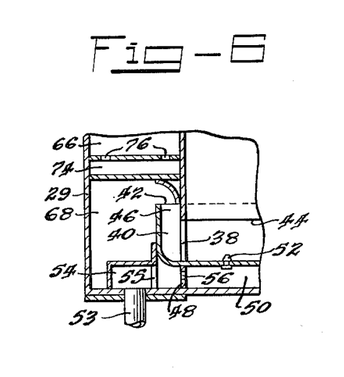
Fig. 6 is a partial section view taken along the line 6—6 of Fig. 3 showing the moderator inlet chamber.

The moderator is fed to the plenum 50 via a 6" pipe 53 (Fig. 6) which leads through an entrance box 54 (Figs. 3 and 6) to a ring header 55 surrounding the plenum 50. A row of radially spaced orifices 56 provides communication for the moderator from the ring header 55 to the plenum 50.

Figure 5:
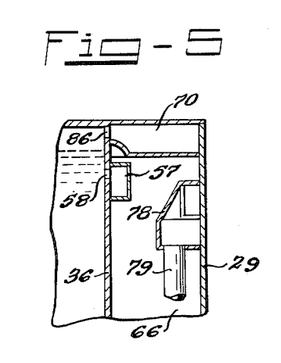
Fig. 5 is a partial section view taken along the line 5—5 of Fig. 2 showing the moderator and reflector fluid outlets.

Near the top of the moderator tank 34 is an annular drain header 57 (Figs. 1 and 5) connected to the moderator tank 34 by a horizontal row of radially spaced orifices 58. Feedwater moderator drains from the annular header 57 through a vertically disposed pipe 59 (Fig. 2). About 70% of the moderator circulation effluent flows through the drain header 57 when the moderator level is at its normal operating height. When the moderator level is below this drain system, i.e., during reactor startup, the entire moderator effluent passes over the weir 46.

The moderator effluent flows from the moderator tank 34 through the drain lines 47 and 59 to a heavy water storage tank 60 located below the reactor as shown in the flow diagram of Fig. 24. The heavy water is cooled by a heat exchanger 61 and returned to the reactor by means of circulation pump means 62. The moderator recirculation rate through the reactor is 1100 g.p.m. when a normal moderator tank inlet temperature of 137° F. and a normal outlet temperature of 160° F.

The active portion 30 of the reactor is submerged within the moderator tank 34 and comprises a combination of 85 concentric tube and rod cluster type fuel assemblies 63 and 64, respectively. The assemblies are suspended within vertical fuel channel assemblies 65 arranged in an 8" equilateral triangular lattice. A detailed description of the fuel assemblies and the fuel channel assemblies will be described hereinafter.

REFLECTOR

A light water neutron reflector 66 (Fig. 1) is contained in an annulus 67 formed by the moderator tank cylinder 36 and the side wall of the reactor shell 29. The annulus 67 extends vertically between a dump chamber 68 at the bottom and a gas header 70 at the top, both hereinafter described; said annulus having a height of 6' 10", an outside diameter of 11', and an inside diameter of 7'. A vent line 71 (Fig. 1) extends into the top of the reflector annulus 67 through the top primary shield 35b.

Figure 4:
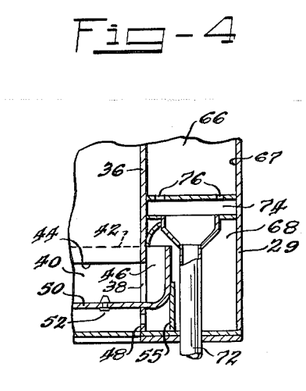
Fig. 4 is a partial section view taken along the line 4—4 in Fig. 2 showing the reflector fluid inlet.

The light water is fed into the reactor shell 29 from the bottom by a 6" pipe 72 (Fig. 4). It feeds into an annular flat plenum 74 extending around the moderator tank 34 at the bottom of the annulus 67 and flows upward through a plurality of radially spaced orifices 76 providing equal distribution of the reflector water.

The light water reflector is drained from the annulus 67 by a ring header 78 (Fig. 5) located about 6" below the top of the annulus. The ring header 78 drains into a 6" outlet line 79 passing vertically downward through the bottom of the reactor shell 29.

Figure 24:
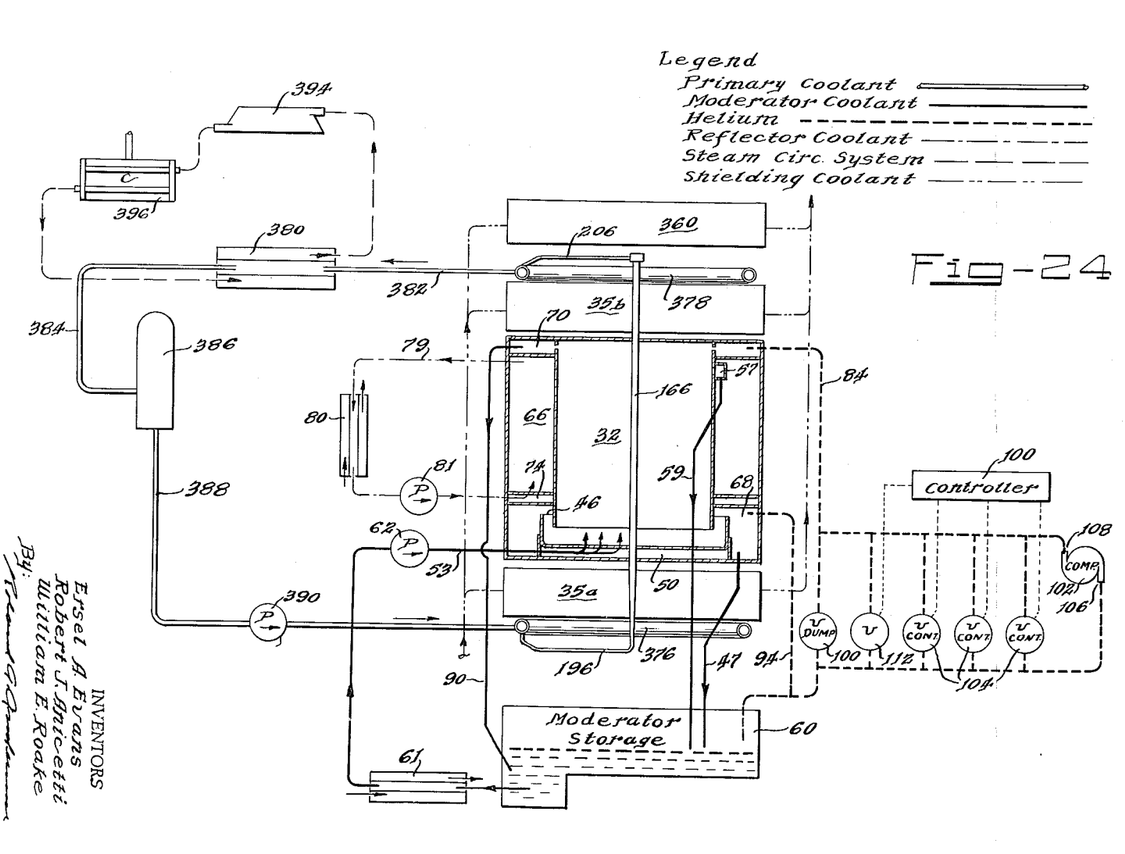
Fig. 24 is a diagrammatic view of the reactor system showing the fluid coolant loops and the gas pressure operated moderator level control and safety system.

The reflector water is cooled by the recirculation of approximately 150 g.p.m. of water through a heat exchanger 80, the water being returned to the annulus 67 via pump means 81 as shown in Fig. 24. The reflector annulus acts as the reflector cooling loop surge tank and the water level may be controlled to a point a few inches above the drain header 78.

Spaced around the reactor shell, radially thereto, and transversely across the reflector annulus 67 are ten chambers 82 (Fig. 1) for flux radiation and testing purposes. These facilities consist of 6" outside diameter aluminum tubes which penetrate the outer wall of the reactor shell 29 but not the cylinder 36 of the moderator tank 34.

PRIMARY CONTROL SYSTEM

The primary control system of the reactor is based on the principle of variation of reactivity of the reactor by variation of the level of moderator in the moderator tank. The moderator level in the moderator tank 34 is maintained and varied by a helium gas pressure balance system.

Helium gas is applied to the upper surface of the moderator within the moderator tank 34 through four 8" gas lines 84 spaced around the moderator tank and extending vertically through the reflector annulus 67, terminating within the annular gas heater 70. A plurality of ports 86 are spaced around the gas header 70 so that the pressurized helium gas may be applied to the upper surface of the moderator 32.

If some unusual operating condition causes the moderator level to rise high enough to overflow into the top gas header 70, a drain line 90 will carry away the overflow, thus preventing flooding of the gas lines 84. Splash baffles 92 are provided at the terminal ends of each of the gas lines 84 to prevent moderator heavy water from entering the gas lines.

Helium gas is also applied to the lower moderator surface formed at the water trapped weir 46 by means of three nominal 8" gas lines 94 terminating within the dump chamber 68. It will be noted that the gas lines 94 terminate above the level of the upper edge 42 of the dish bottom 40 to prevent heavy water moderator flowing over the weir 46 from entering and flooding the gas lines.

As shown in Fig. 24 the dump chamber 68 is connected directly to the heavy water storage tank 60 through the lower gas lines 94 while the upper gas header 70 is connected through the gas lines 84 and normally closed dump valves 100 to the water storage tank 60.

The pressure differential across the moderator tank 34 is established and maintained by a helium compressor 102 and associated control valves 104 connected between the outlet 106 and inlet 108 of the compressor 102. The compressor 102 is a positive displacement rotary type having a capacity of 50 s.c.f.m. A small amount, normally 10 s.c.f.m., will flow into the upper gas header 70 to supply a gas sweep through the upper part of the moderator tank 34. Another small flow normally about 3 s.c.f.m. will be purged to a helium purification system not shown in the drawings. The equilibrium pressure in the storage tank is obtained when the remainder of the 50 s.c.f.m. supplied by the compressor is returned to the compressor inlet 102. The differential pressure applied across the moderator tank 34 is determined by the setting of the control valves 104 and may be varied by changing their settings. The control valves 104 are sized to maintain the moderator level within $\pm 0.05''$ of the control point over a range of moderator levels from 36'' to 111'' (measured from the bottom of the moderator tank), the normal operating range being approximately 105.'' This range provides a control action extending well below the minimum level of approximately 53'' at which the reactor reaches criticality.

The maximum rate of increase of reactivity through increases in the moderator level is limited by the capacity of the helium compressor 102. The maximum rate of decrease of reactivity through decreases in the moderator level, discounting scram conditions, is limited by the capacity of the control valves 104. Since the rates of level change are limited by the gas system capacities they will be dependent on the pressure differential and thus on the level of the moderator 32 in the moderator tank 34.

The features of reactivity control through moderator level adjustment make this reactor particularly amenable to automatic control. A controller 110 is provided which adjusts the moderator level control valve settings to maintain a desired reactor neutron flux level and/or period. Three input signals are supplied to the controller 110 from neutron flux monitors in the reactor. These are (1) a signal proportional to reactor power (neutron flux) level from high level channels; (2) a period signal from low level logarithmic channel period amplifiers; and (3) a period signal from the startup (count rate) channel period amplifier. The signals are so selected by the controller as to provide period control at reactor powers below the high level range and power level control with short period override within the high level range.

In addition to the above actions, the controller 110 operates a shutdown valve 112 to assist control valve action. The shutdown valve 112 is a quick-opening type with capacity equal to the total control valve capacity. The controller opens this valve whenever the reactor powerlevel exceeds demand level or the period is shorter than demand value by a preset amount. It closes the valve again when these conditions no longer exist. Opening of the shutdown valve accentuates control valve action producing a rapid decrease in reactivity.

SAFETY SYSTEM

Reactor scram or emergency shutdown is quickly accomplished by a rapid drainage of the moderator from the moderator tank 34. A scram may be initiated automatically whenever a condition exists which threatens the integrity of the reactor or its auxiliary facilities, or it may be initiated manually by the operator.

As was hereinbefore described, four gas lines 84 connect the upper gas header 70 to the $D_2O$ moderator storage tank 60 and three gas lines 94 connect the dump chamber 68 to the $D_2O$ storage tank. The lines 84 are normally closed by the quick opening dump valves 100. The dump valves are held closed by solenoids (not shown) during reactor operation whereupon they will be opened upon receipt of a scram signal. Powerful springs open the valves rapidly. At the same time, the compressor 102 in the primary control system is stopped, and the control valves 104 are opened fully. Gas pressure within the system equalizes rapidly and the moderator drains from the moderator tank by gravity.

The dump valves 100 are designed to open fully in .1 second or less and to have low resistance to gas flow when open. When the valves 100 open gas pressure in the moderator tank 34 will quickly be equalized and the moderator within will immediately begin to drop into the dump chamber 68 under gravity flow. A small portion of the moderator flow will be returned to the storage tank 60 by the 8'' drain line 47 but the larger part will be retained in the dump chamber 68. The three bottom gas lines 94 with their elevated terminal ends permit the gas displaced from the dump chamber to flow to the storage tank 60.

Within 1.0 second after receipt of a scram signal the moderator level will fall two feet decreasing reactivity by approximately 18 mk. (with a moderator level initially at its maximum in the reactor tank). At this time the dump chamber 68 will have filled with moderator and further flow is limited by the capacity of the three gas lines 96 and the drain line 47 leading to the storage tank. Under these conditions the moderator level will continue to drop at about 0.8' per second, the rate decreasing as the moderator tank empties. The average outflow rate will be in excess of 18,000 t.p.m. and within eight seconds the moderator surface will be at the level of the outflow weir 46. The corresponding decrease in reactivity is approximately 1400 mk.

The safety system is so designed that the failure of two dump valves 100 to open will not materially decrease dump rates. Failure of a third valve would decrease dump rates somewhat but would provide rapid shutdown for all conceivable scram incidents.

SHIM CONTROL SYSTEM

A shim control system is provided in the reactor 28 for gross adjustments of reactivity. The primary purposes of the shim control system are maintenance of the moderator level within the normal operating range, compensation for fuel burnout, provision for xenon override and flattening of neutron flux. It also provides for depression of the flux in selected portions of the reactor if desired for experimental purposes.

Figures 21, 22:
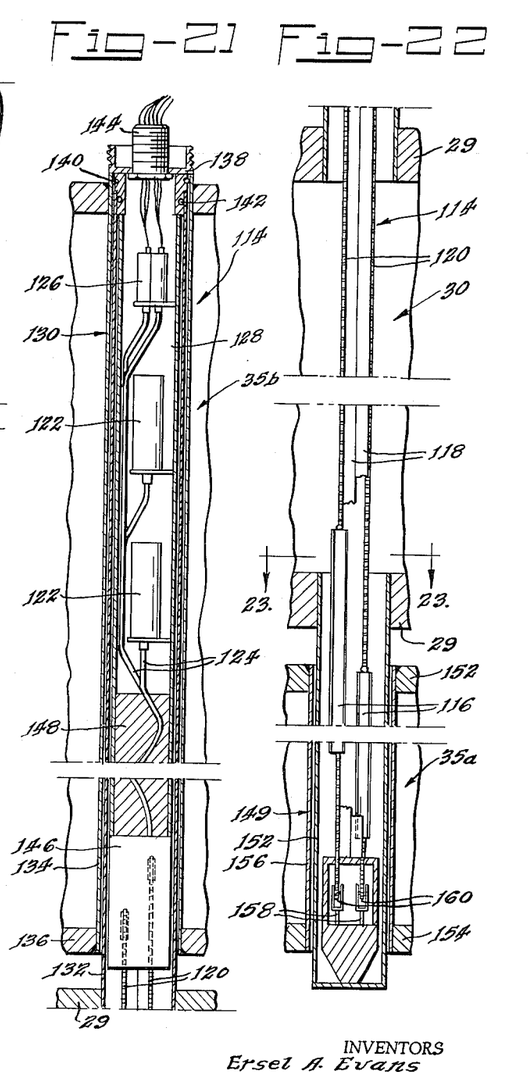
Fig. 21 is a vertical section view of the upper portion of a shim control unit.
Fig. 22 is a vertical section view of the lower portion of a shim control unit situated within its housing.
Figure 23:
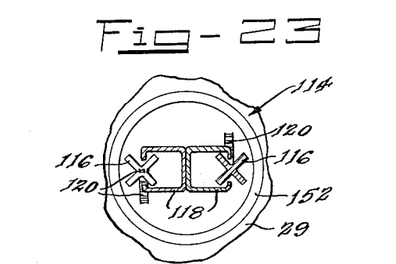
Fig. 23 is a horizontal section view of a shim control assembly taken along the line 23—23 in Fig. 22.

Eighteen shim control units 114 as shown in Figs. 21–23 are provided in the reactor. The shim control units 114 are vertically disposed in the reactor and are spaced throughout the active portion 30 as indicated in Fig. 2.

Each of the shim control units 114 comprises two boron containing stainless steel absorber elements 116, approximately 36'' long and having cruciform cross sections (Fig. 23). The absorber elements 116 are exposed directly to the moderator 32 and are guided in their vertical travel by aluminum guides 118 which act also as the structural supports of the shim control units 114.

The position of each absorber element 116 in each shim control unit 114 is individually adjustable by a loop of miniature stainless steel stud chain 120 driven by a miniature electric motor 122 (Fig. 21), geared to the stud chain by a flexible cable 124. Indications of the absorber elements' positions are transmitted to the reactor control room by electrical position transmitters 126.

The electric motors 122, the gearing means including the flexible cables 124, and the position transmitters 126 are all contained within a cylindrical housing 128 positioned within a double walled tube 130 extending through the top primary shield 35b of the reactor. The inner wall 132 of the double walled tube 130 is weld sealed to the top of the reactor shell 29, and the outer wall 134 is weld sealed at its bottom end to plate 136 forming the bottom of the top primary shield 35b. An adapter plug 138 at the top of the cylindrical housing 128 is sealed to the inner and outer walls of the tube 130 by means of O rings 140 and 142, respectively. An electrical connector 144 is provided in the plug 138 for the wires to the position transmitters 126 and the motors 122. At the bottom of the cylindrical housing 128 and attached to the top of the aluminum guides 118 is a gear box 146 housing spur and worm gear drives (not shown) for the stud chains 120. The gear box 146 also serves to seal the interior of the cylindrical housing 128 to prevent any moderator from entering therein. Immediately above the gear box 146 is a neutron and gamma ray absorbing shield plug 148 to reduce the radiation intensity on the motors and transducer as well as reduce radiation escape through the top primary shield 35b.

The lower end of each of the shim control units 114 resides within a double walled tube 149 (Fig. 22) within the bottom shield 35a. The outer wall 150 is weld sealed at its ends to the top and bottom plates 152 and 154, respectively, of the bottom shield 35a. The inner wall 155 is sealed at its upper end to the bottom of the reactor shell 29. Within the double walled tube 149 and attached to the lower end of the guides 118 is a mounting 158 for the gear pulleys 160 of the chain drive. It will be noted that the double walled tube 149 extends deep enough so that the absorber elements 116 are contained completely within the lower shield 35a when in their withdrawn position.

Operation of the shim units is entirely manual by means of switches operable by the reactor operator. The shim control units are not intended to be used as safety devices.

FUEL CHANNEL ASSEMBLY

The fuel channel assemblies 65 are double walled construction providing insulated pressurized water cooled passages in which the fuel assemblies 63 and 64 are suspended as shown in Figs. 7–10 of the drawings. Each of the 85 fuel channel assemblies 65 comprise an outer wall 158, hereinafter called a shroud tube, which is welded to the bottom of the reactor shell 29 at its lower end 160 (Fig. 9) and is connected to the upper plate of the reactor shell 29 by means of a bellows 162 (Fig. 8) at its upper end 164. Thus, the shroud tube 158 is an integral part of the reactor shell 29, the bellows 162 providing for differential thermal expansion.

The shroud tubes 158 of 84 of the fuel channel assemblies 65 are fabricated of aluminum tubing having a 4.250" outside diameter with a 0.060" wall thickness. The centermost shroud tube 165 is a 6" O.D. aluminum tube having a 0.085" wall thickness which accommodates special experiments as required in the reactor.

The inner wall 166 of the double walled fuel channel assembly 65, hereinafter called the process tube, fits concentrically within the shroud tube 158 and is spaced therefrom to form an insulation gap 168 between the heavy water moderator in the moderator tank 34 and the water coolant flowing within the fuel channel assembly. The process tube 166 is suspended within the shroud tube 158 (Fig. 8) by means of a clamping sleeve 170 and collar 172 which screws into a fitting 174 compressing a gas seal ring 175. The fitting 174 is weld sealed to a tube 176 extending from and forming an integral part of the upper shield 35b.

Each of the process tubes 166 is fabricated of a zirconium containing alloy such as Zircaloy-2 and has a 3.250" inside diameter with a 0.154" wall thickness in the reactor active portion 30. Zircaloy-2 has the following composition: Sn 1.2–1.6%, Fe 0.08–0.17%, Cr 0.06–0.14%, Ni 0.03–0.07%, $N_2$ <0.009, average 0.007, and Zr balance. The lower end 178 of each process tube 166 (Fig. 10) is tapered to a smaller diameter with greater wall thickness for ease of assembly with the lower face piping hereinafter described.

Figure 10:
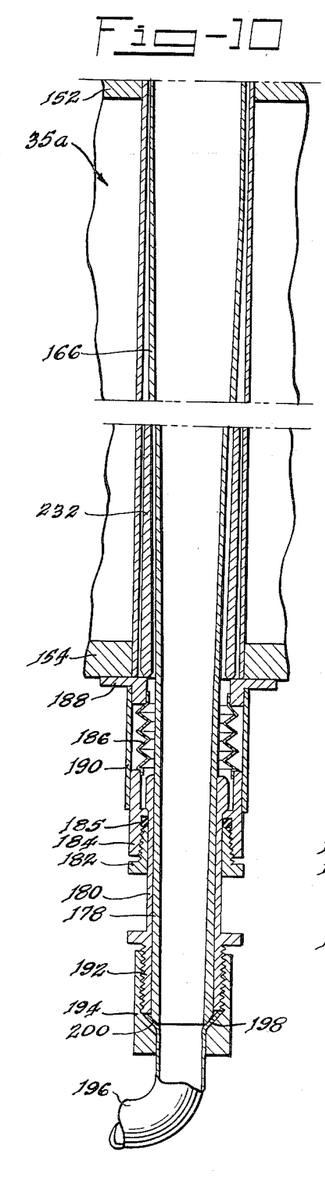
Fig. 10 is a section view of the lower portion of a fuel channel assembly.
Figures 11, 12, 14:
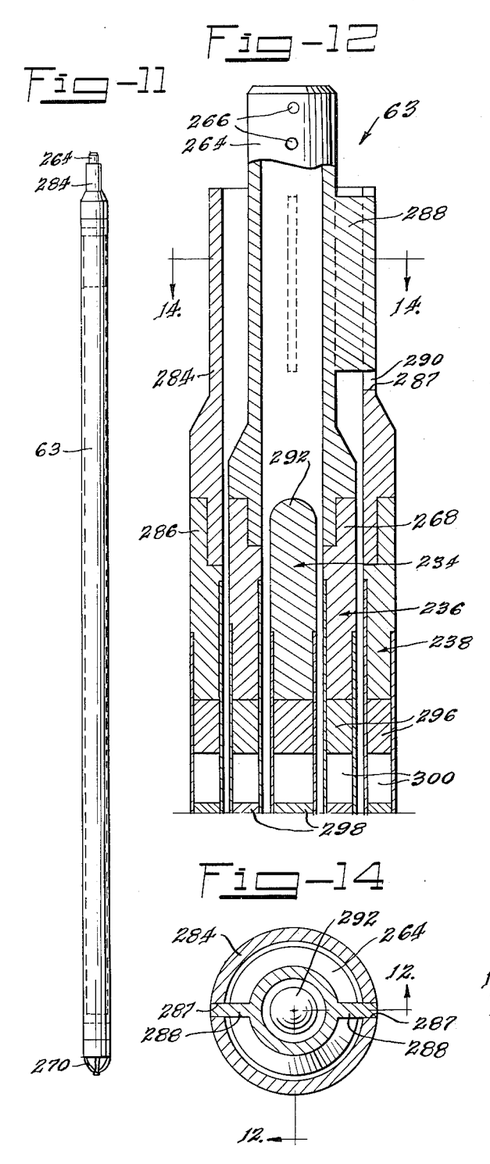
Fig. 11 is an elevation view of a concentric tube type fuel assembly.
Fig. 12 is a vertical section view of the upper portion of a concentric tube type fuel assembly taken along the line 12—12 of Fig. 14.
Fig. 14 is a horizontal section view of a fuel assembly taken along the line 14—14 on Fig. 12.
Figure 13:
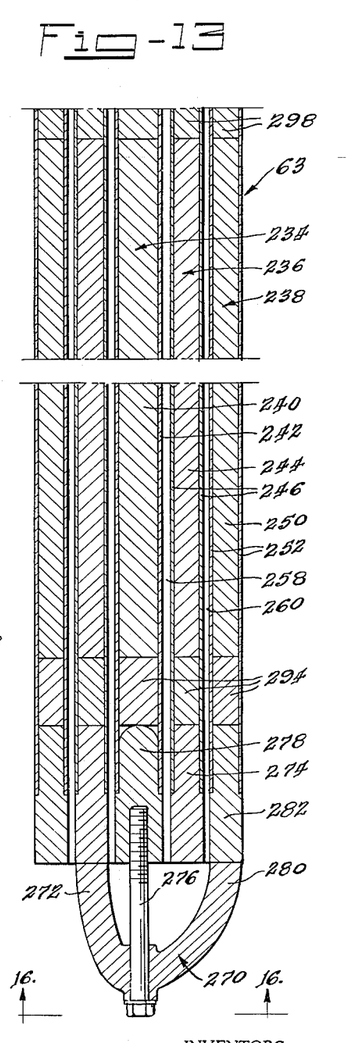
Fig. 13 is a vertical section view of the lower portion of a concentric tube type fuel element also taken along the line 12—12 of Fig. 14.

The lower tapered end 178 of the process tube 166 extends downward below the bottom plate 154 of the bottom shield 35a and is secured thereto by means of a clamping sleeve 180 and collar 182 which screws into a fitting 184 compressing a gas seal 185. The fitting 184 is welded to one end of a bellows 186 whose other end is connected to a shoulder collar 188 welded and sealed to the bottom plate 154 of the bottom shield 35a. The fitting 184 slidably engages the inside of a guide tube 190 attached to the shoulder collar 188 thereby providing for any differential thermal expansion of the process tube 166 with respect to the reactor tank 29 and/or the bottom and top shields 35a and 35b, respectively.

The clamping sleeve 180 has a threaded portion 192 at its lower end which is adapted to receive a coupling nut 194 on coolant inlet jumper 196. The inlet jumper 196 has a flared end 198 which is clamped between the coupling nut 194 and the chamfered end 200 of the process tube 166.

Connected to the upper end 202 of the process tube 166 (Fig. 8) is a coupler fitting 204 connecting coolant outlet jumper 206 to the interior of the process tube 166. A connecting collar 208 engages a flange 210 on the clamping sleeve 170 and threadedly engages the lower end 211 of the fitting 204, seal ring 212 preventing coolant leakage.

Figures 7, 8:
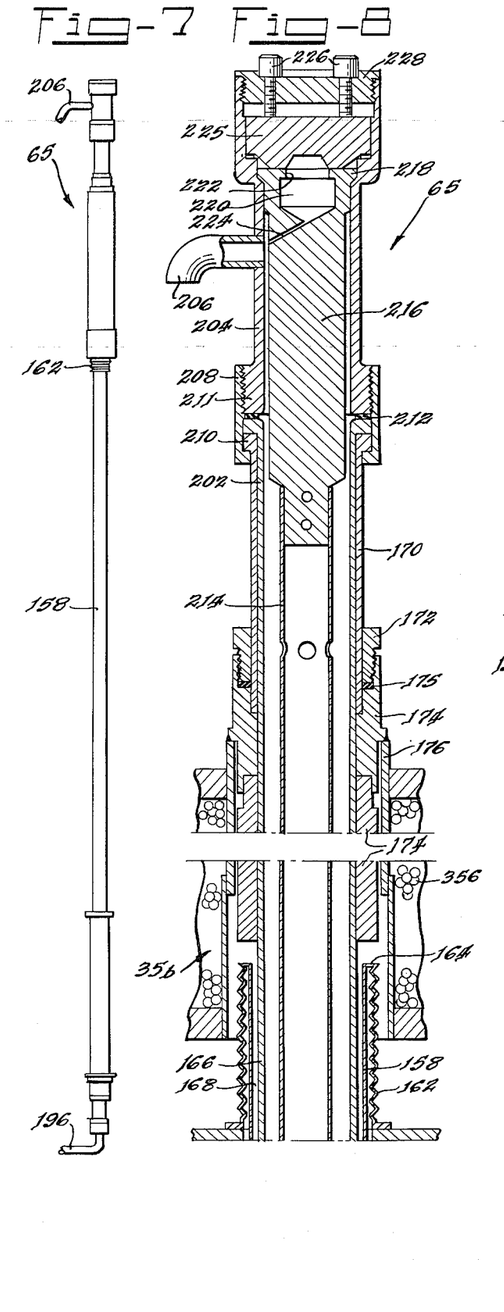
Fig. 7 is an elevation view of a fuel channel assembly.
Fig. 8 is a section view of the upper portion of a fuel channel assembly showing the suspension means therein for a fuel assembly.

The coupler fitting 204 also provides access to the interior of the process tube 166 through which the fuel assembly may be inserted and extracted. A fuel assembly such as the concentric type 63 is suspended therein by means of a perforated tube 214 from a plug 216 engaging the fitting 204 at shoulder 218. The plug 216 has a cylindrical cavity 220 axially aligned in its upper end with an inwardly extending flange 222 adapted for engagement with a fuel assembly manipulating tool (not shown). A drain passage 224 is provided to leak off any liquid which may find its way into the cavity 220. The plug 216 is held in position by a constraining member 225 forced downwardly by screws 226 in cap 228 which threadedly engages the top of the fitting 204.

The plug 216 is fabricated of a neutron and gamma ray absorbing material such as boron containing stainless steel to reduce radiation emanating from the top of the fuel channel assembly. It will be noted that a shield plug 230 is suspended from the fitting 174 (Fig. 8) in the annulus between the process tube 166 and the top shield 35b, said shield plug also being fabricated of an absorber material such as boron containing stainless steel. Another shield plug 232 is disposed within the tapered annulus between the lower portion of the process tube 166 and the bottom shield 35a (Fig. 10).

FUEL ASSEMBLIES

The reactor herein described is capable of forming plutonium in sufficient quantity to maintain self-sustaining operation, i.e., using natural (or perhaps depleted) uranium feed material and self-produced plutonium. The reactor uses spiked enrichment wherein natural uranium in the form of uranium dioxide is contained in concentric tube type fuel assemblies 63 and plutonium in the form of an alloy is contained in rod cluster type fuel assemblies 64. The alloy used comprises aluminum and 1.5–2.5 w/o plutonium.

The plutonium bearing fuel assemblies are interspersed throughout the active portion 30 of the reactor and lead to a high throughput of the uranium fuel assemblies. Spike enrichment is useful in a test reactor of the type described as it permits segregation of plutonium of varying exposures to enable the most strategic placement of each variety of plutonium available. The spike enrichment method also provides more flexibility in the use of plutonium as flattening enrichment and facilitates the removal of the Pu-242 and higher isotopes from the cycle.

CONCENTRIC TUBE TYPE FUEL ASSEMBLIES

Reference is made to Figs. 11–16 showing a uranium dioxide containing concentric tube type fuel assembly 63. Each fuel assembly 63 comprises a solid, central cylindrical uranium dioxide containing element 234 (Fig. 15) surrounded by a first concentric tubular uranium dioxide containing element 236 and a second concentric tubular uranium dioxide containing element 238.

Figure 15:
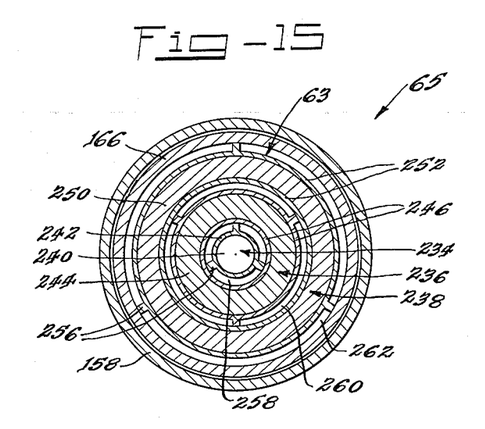
Fig. 15 is a horizontal section view of a concentric tube type fuel assembly taken along the line 15—15 of Fig. 9.
Figure 16:
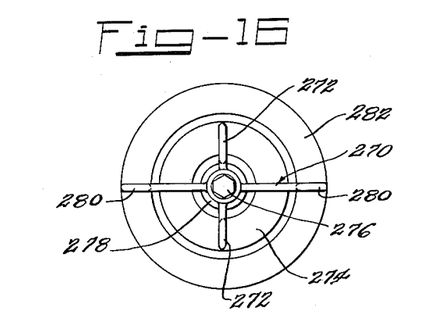
Fig. 16 is an end view of the concentric tube type fuel assembly taken along the line 16—16 of Fig. 13.

The central element 234 comprises a 7' 4" long rod-like core 240 having a 0.580" diameter and is clad with a sheath or jacket 242 in heat exchange relationship therewith. The sheath 242 measures 0.030" thick and is fabricated of a zirconium containing alloy such as Zircaloy-3. Zircaloy-3 is composed of approximately 0.25% tin, 0.25% iron and the remainder zirconium.

The first or inner tubular element 236 comprises a 7' 4" long tubular core 244 measuring 1.065" I.D. and 1.820" O.D. It is clad in a Zircaloy-3 jacket 246 in heat exchange relationship therewith. The second or outer tubular element 238 comprises a 7' 4" long uranium dioxide core 250 measuring 2.300" I.D. and 2.970" O.D. It is clad in a Zircaloy-3 jacket 252 in heat exchange relationship therewith.

The cladding jackets are all 0.30" thick and each has longitudinally disposed, radially spaced ribs 256 on its outer periphery. The ribs 256 on the central element 234 space it from the first tubular element 236 maintaining a coolant annulus 258 therebetween. The ribs 256 on the periphery of the first tubular element 236 maintain a coolant annulus 260 whereas the ribs on the periphery of the second tubular element 238 space the fuel assembly 63 within the process tube 166 to maintain a coolant annulus 262 as shown in Fig. 15.

Figure 9:
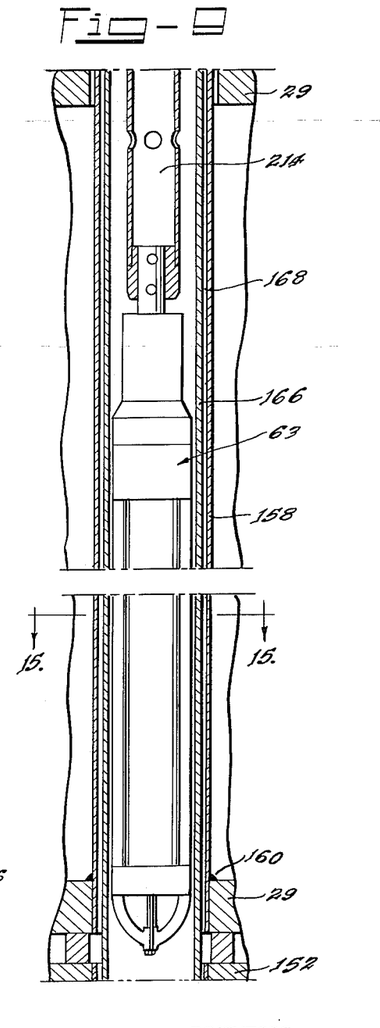
Fig. 9 is a section view of the middle portion of a fuel channel assembly and shows a fuel assembly situated therein.

The total weight of the fuel assembly 63 is supported by an extension 264 (Fig. 12) to the inner or first tubular element 236 which engages the suspended perforated tube 214 and secured thereto by pins 266 (Fig. 9). The extension 264 is welded to an annular end piece 268 which closes and seals the first tubular element 236 at its upper end.

At the bottom of the first tubular element 236 (Figs. 13 and 16) a 4-pronged support bracket 270 has two radially opposite prongs 272 attached to an end piece 274 closing and sealing the bottom end of the tubular element 236. A bolt 276 extending through the center of the support bracket 270 is threaded into an end piece 278 closing and sealing the bottom end of the central fuel element 234. The other two radially opposite prongs 280 of the support bracket 270 engage an end piece 282 which closes and seals the bottom end of the second or outer tubular element 238.

The upper end of the outer tubular element 238 (Fig. 12) has a tubular extension 284 welded to an end piece 286 forming a seal closure for the upper end of the outer tubular element. The tubular extension 284 has two radially opposite slots 287 (Figs. 12 and 14) extending from its upper end in which the radially opposite fins 288 on the first tubular element extension 274 are slidably disposed. It will be noted that a gap 290 exists between the bottom of the slot 287 and the bottom of the fins 288 which permits differential axial expansion of the outer tubular element 238 with respect to the inner tubular element 236.

The central element 234 is unsupported at its upper end and is closed and sealed by an end piece 292. Thus, the central element is free to expand axially without effect on the assemblies' inner and outer tubular elements. The end piece may be designed to receive a special tool to remove the central element 234 which unscrews it from bolt 276 at the bottom of the assembly without disturbing the rest of the assembly.

It will be noted that each of the elements 234, 236 and 238 contain a structural plug 294 between its respective core and end piece which is required in the fabrication of the individual fuel elements. Structural plugs 296 are also disposed at the upper ends of the respective elements abutting the respective upper end pieces. Immediately above the uranium dioxide cores 240, 244 and 250 in the respective elements are zirconium or aluminum containing plugs 298 which extend upward leaving gaps 300 providing for the axial expansion of the cores and also the entrapment of gases formed by the fissioning fuel.

The concentric tube type fuel element offers a safety feature which is not as prevalent in fuel assemblies of the rod cluster type or plate type assemblies upon loss of coolant flow. It will be noted in Fig. 15 that the coolant annuli 258, 260 and 262 appear as uniform moderator containers to neutrons entering the fuel channel assembly 63 from the main body of moderator 32. Under normal operating conditions the coolant in the annuli has a moderating effect on the entering neutrons as well as on neutrons released in fissioning of the fuel contained in the assembly fuel elements. Thus upon loss of coolant in the fuel channel assembly almost all of the neutrons will be affected by the loss of moderator in the coolant annuli.

Figure 19:
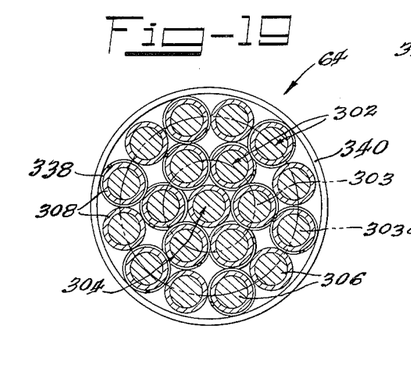
Fig. 19 is a horizontal section view taken along the line 19—19 of Fig. 17.
Figure 20:
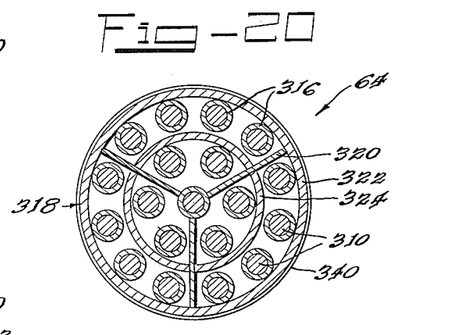
Fig. 20 is a horizontal section view taken along the line 20—20 of Fig. 17.

In rod cluster type fuel elements such as shown in Fig. 19 or in plate type fuel assemblies all of the neutrons entering from the main body of moderator would not pass through moderator coolant containers as some neutrons could travel in a path from one element to another without ever passing through a coolant passage. The same is true in plate type assemblies where neutrons entering the assembly parallel to the plates might travel within the confines of the plates without ever crossing a coolant channel. The loss of coolant therefore would have no effect on these neutrons. Thus the concentric tube type design provides a more fail-safe assembly upon accidental loss of coolant passing therethrough.

ROD CLUSTER TYPE FUEL ASSEMBLIES

Reference is now made to Figs. 17–20 wherein is shown one of the rod cluster type fuel assemblies 64. These assemblies are used for the enrichment spiking of the reactor and hence contain plutonium in an aluminum-plutonium alloy as hereinbefore described. The rod cluster type fuel assembly 64 comprises 19 rod type elements 302 arranged in two concentric rings 303 and 303a around a centrally disposed element 304 (Fig. 19).

Each element comprises a fuel bearing core 306 measuring 7' 4" in length and having a 0.504" O.D. The core 306 is clad in a 0.030" thick sleeve or jacket 308 which is fabricated of a zirconium containing alloy such as Zircaloy-2. Each of the rod type elements 302 has a spindle type fitting 310 (Figs. 17 and 18) at either end which serves as a seal closure for the element. The upper end spindle fittings 310 engage a top support bracket 312 having a tubular extension 314 which engages the perforated suspending tube 214 within the process tube. The spindle portions of the fuel element end fittings 310 are inserted into tubular spacers 316 (Fig. 20) welded to a framework 318 forming the top bracket. The framework 318 comprises three radially disposed, equally spaced ribs 320 extending outwardly to an annular member 322. Arcuate members 324 are welded between the radially disposed ribs 318. Each of the tubular spacers 316 engaging the outermost circle of elements 303a is welded to the annular member 322. The inner circle of spacer rings 316 are each welded to an arcuate member 326.

Figure 17:
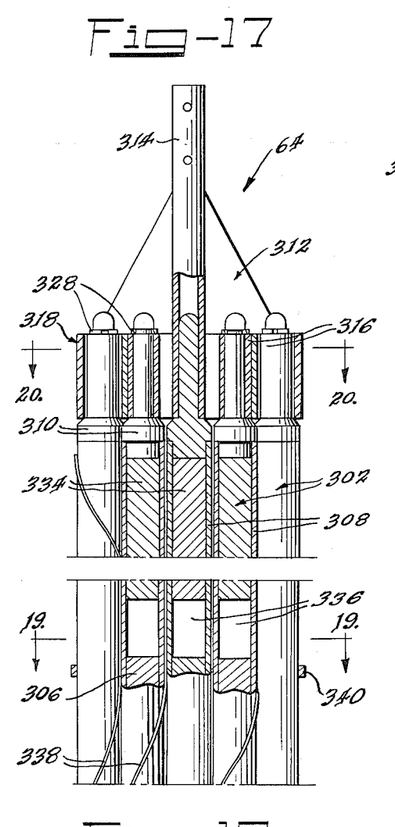
Fig. 17 is a vertical section view, in part, of the upper portion of a rod cluster type fuel assembly.
Figure 18:
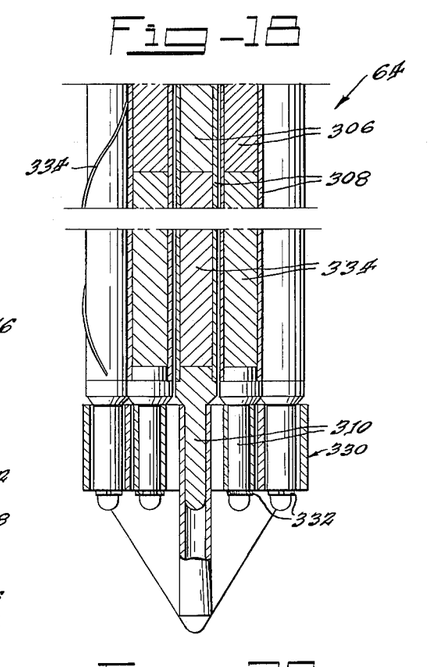
Fig. 18 is a vertical section view of the lower portion of a rod cluster type fuel assembly.

It will be noted in Fig. 17 that the central most fuel element 304 has its upper spindle end fitting 310 extending into the interior of the tubular extension 314. Snap rings 328 lock the spindle portion of the end fittings 310 into the tubular spacers 316 thus suspending them therefrom.

The spindle type end fittings 310 at the lower end of the fuel elements 302 engage a bottom support bracket 330 which is, essentially, like the top bracket 312 except for the absence of the tubular extension 314. The bottom bracket 330 is held in place by means of snap rings 332 around the spindle ends of the end pieces 310.

It will be noted that each of the fuel elements 302 has spacer plugs 334 at its upper and lower ends abutting the end pieces 310 which serve in the fabrication processes of the rod type elements. Each of the elements 302 also has a gap 336 at its upper end to allow for the axial expansion of the core 306 as well as the buildup of fission product gases.

To space the elements for adequate coolant flow over all surfaces a 0.72" Zircaloy-2 wire 338 is spiral wrapped around every other fuel element 302 in the outermost ring 303a of elements and around each of the elements 202 in the inner ring 303. The cluster of rods is also surrounded by several Zircaloy-2 rings 340 to maintain alignment of the elements and space them within the process tube 166.

It will be understood that the rod cluster type fuel assembly may contain uranium in the form of uranium dioxide rather than the plutonium aluminum alloy. Reference is made to the table hereinafter presented for the modified weights and dimensions when uranium dioxide is employed.

REACTOR SHIELDING

The biological shield of the reactor comprises the cylindrical wall 342 (Fig. 1) forming the concrete cell 35. A high density concrete is used for the wall measuring approximately 71" thick and about 21' in depth. The inside wall of the concrete cell 35 is faced with a steel liner 344, ½" thick, which also functions as a gas seal for the pile atmosphere. The inside face of the biological shield is kept below 120° F. by circulating water through ½" pipes 346 attached to the concrete side of the steel liner 344.

Supported inside the steel liner 344 is a thermal shield 348 consisting of twelve iron slabs 6" thick, 3' wide and 11' high weighing approximately four tons each. The purpose of the thermal shield 348 is to remove about 90% of the energy escaping from the reflector 66 before it reaches the concrete biological shield. The slabs forming the thermal shield 348 are cooled by a series of vertical cooling tubes 350 located along their inside surfaces. The maximum temperature in the iron thermal shield is approximately 150° F.

The reactor 28 rests on the bottom primary shield 35a which is supported by a steel reinforced base ring 352 in the concrete cell 35. The base ring 352 also serves to support the thermal shield 348. The bottom primary shield 35a comprises a cylindrical steel tank 354 approximately 40" thick filled with a mixture of iron pellets 356 and water. The mixture comprises approximately 63% iron and 37% water by volume, the minimum density approximating 285 pounds per cubic foot. In addition to its moderating ability the water functions as a shield coolant which is circulated upward through the shield at approximately 50 gallons per minute. This water has an inlet temperature of approximately 145° F. and an outlet temperature of approximately 185° F. when the reactor is operating at its maximum designed power level.

The top primary shield 35b is supported directly over the reactor shell 29 by a shoulder 357 formed in the cell 35 and is similar in construction to the bottom shield 35a. It comprises a 40" thick tank 358 containing a similar mixture of iron pellets and circulated water.

Above the top primary shield 35a is the top secondary shield 360 which consists of a stationary ring 362 in which is mounted two rotating disks 364 and 366, and an access plug 368. Both rotating disks are supported on ball bearings 369 and the center disk 366 is located eccentrically in the outer disk 364 so that the eccentrically located access plug 368 can be positioned over any desired spot in the reactor. The components of the top secondary shield 360 are approximately 27" thick, and are formed of plate steel filled with a mixture of steel punchings and limonite grout having an average density of approximately 320 pounds per cubic foot. The lower surfaces of the top secondary shield components are cooled by circulating water through cooling tubes 370 embedded in the concrete.

Since the primary coolant system uses pressurized fluid as hereinafter described a sizable leak in the coolant piping in-between the top primary shield 35b and the top secondary shield 360 could build up a pressure great enough to lift the top secondary shield making it necessary to hold it down. The stationary ring 362 is held down by six equally spaced radially aligned holddown pins 372 that protrude into sockets 373 in the top portion of the concrete wall 342 forming the cell 35. Interlocking lugs 374 hold down the two rotating disks 264 and 266 and the access plug 268 when they are rotated to an operating position. The disks must be oriented in the operating position to permit connection of the shield cooling water lines. The holddown devices are designed to withstand the force exerted by an 18 p.s.i. pressure difference.

The top and bottom shields reduce the neutron flux escaping the core by a factor of $10^6$ as well as attenuate the associated gamma radiation. The top primary and secondary shields are designed to reduce these radiations directly above the reactor to a maximum level of 5 mrem./hr. with the reactor operating.

PRIMARY COOLING SYSTEM

Heat generated in the fuel assemblies is removed by circulating heavy water coolant through the process tubes 166 via an inlet header 376 (Fig. 1) connected to the bottom of the process tubes by the inlet jumpers 196 and an outlet header 378 connected to the top of the process tubes via outlet jumpers 296. The primary coolant system is shown as a flow diagram in Fig. 24.

The heavy water flows from the outlet header into a heat exchanger 380 via pipe means 382. Through pipe means 384 the cooled heavy water is introduced into a pressurizer 386 which operates as a surge chamber for the expansion and constraction of the coolant. Pipe means 388 transport the coolant to the suction site of recirculation pumping means 390 which delivers it to the inlet header 376 via pipe means 392. The recirculation pumping means 390 comprises three recirculation pumps of which two operate at any one time circulating approximately 8400 gallons per minute of heavy water at a system pressure of 1050 p.s.i. through the reactor and heat exchanger. The dynamic head of each of the pumps is 100 p.s.i.

The reactor heat removed by the primary coolant (approximately 66 mw.) raises the temperature of the coolant from 479° F. to about 530° F. A temperature controlled bypass around the heat exchanger (not shown) maintains the temperature of the primary coolant at 479° F.

On the steam side of the heat exchanger 380 heat is removed by boiling 207,000 pounds of water per hour into 425 p.s.i.a. saturated steam. To produce electricity the steam would be fed into a turbogenerator 394 and returned to the heat exchanger 380 through a condenser 396.

The following table summarizes the engineering data for the described reactor.

SUMMARY OF ENGINEERING DATA

General reactor data

| | |
|---|---|
| Power level (nominal) | 70 mw. |
| Heat to primary coolant loop | 66 mw. |
| Heat to moderator coolant loop | 4 mw. |
| Heat to reflector | 1 mw. |
| Primary coolant flow | 8400 g.p.m. $D_2O$ at 478° F. |
| Primary coolant pressure | 1050 p.s.i.g. |
| Reactor inlet temperature | 478° F. |
| Reactor outlet temperature | 530° F. |
| Number of process tubes | 85. |
| Lattice | 8 in. equil. triangle. |
| Fuel loading: | |
| Number of tubes of $UO_2$ | 37–75. |
| Number of tubes of plutonium | 10–48. |
| Max. tube power | 1200 kw. |
| Max. tube flow | 123 g.p.m. |
| Max. tube outlet temperature (max. $\Delta T = 125\%$ bulk $\Delta T$) | 543° F. |
| Neutron flux, thermal, avg. | $4 \times 10^{13}$ neut./(cm.$^2$)(sec.). |
| Fuel exposure U | 5–8000 mwd./t. |
| Xenon override time | 1–2 hours. |
| Time required for: | |
| Shutdown (normal) | 10 mw./min. |
| Cool and depressurize primary coolant system (normal) | 2 hours. |
| Charge-discharge (one tube) | 20 min. |
| Pressurize primary coolant system | Less than 5 min. |
| Startup (from critical to full power)— | |
| Cold | 2 hours. |
| Hot | 10 mw./min. |
| Power and neutron flux distribution (unflattened): | |
| Radial flux dist. ($D_2O$ reflector) | 0.72 avg./max. (1.39 max./avg.). |
| Radial flux dist. ($H_2O$ reflector) | 0.46 avg./max. (2.17 max./avg.). |
| Vertical flux dist. (7.4 foot fuel) | 0.636 avg./max. (1.57 max./avg.). |

PROCESS TUBES

| | |
|---|---|
| Material | Zircaloy-2. |
| Dimensions I.D. (active zone) | 3.250 in. ± 0.010 in. |
| Wall thickness (active zone) | 0.154 in. ± .008 in. |
| Length | 17 ft. 5¼ in. |
| Wall thickness (inlet end) | 0.250 in. |
| O.D. (inlet end) | 2 1/16 in. |
| Weight | 85 lb. |
| $D_2O$ flow area for empty tube (active zone) | 8.3 in.$^2$ (0.0576 ft.$^2$). |
| $D_2O$ flow area with cluster assembly in tube | 3.56 in.$^2$ (0.0246 ft.$^2$). |
| $D_2O$ flow area with concentric assembly in tube | 2.73 in.$^2$ (0.0187 ft.$^2$). |
| Equivalent diameter with cluster assembly in tube | 0.325 in. (0.0271 ft.). |
| Equivalent diameter with concentric assembly in tube | 0.289 in. (0.0241 ft.). |
| Reynolds No. empty tube | 860,000. |
| Reynolds No. with cluster assembly | 200,000. |
| Reynolds No. with concentric assembly | 234,000. |
| $D_2O$ flow/tube, maximum | 123 g.p.m. |
| $D_2O$ velocity, empty tube (123 g.p.m.) | 4.75 ft./sec. |
| $D_2O$ velocity, 19 rod cluster assembly (123 g.p.m.) | 11.1 ft./sec. |
| $D_2O$ velocity, concentric assembly (123 g.p.m.) | 14.7 ft./sec. (avg.). |
| $D_2O$ inventory (85 tubes and nozzles) | 450 gal. w./19 rod. |
| Pressure drop across cluster assembly | ~ 7 p.s.i. |
| Pressure drop across concentric assembly | ~ 15 p.s.i. |
| Design stress | 14,400 p.s.i. |

ROD CLUSTER FUEL ASSEMBLY

| | |
|---|---|
| Length of active core | 7 ft. 4 in. |
| Length of assembly | 8 ft. 3 in. |
| Length of hanger | 6 ft. 2 in. |
| Length of fuel assembly (hanger and fuel assembly) | 14 ft. 5 in. |
| Core diameter (Pu-Al) | 0.504 in. |
| Sheath material | Zircaloy-2. |
| Sheath thickness | 0.030 in. |
| Core cross sectional area (19 assemblies) | 3.76 in.$^2$. |
| Total cross sectional area (19 assemblies) w/o wire wrap | 4.76 in.$^2$. |
| Core weight: | |
| $UO_2$ | 122 lb. |
| Pu-Al | 32.8 lb. |
| Fuel element assembly weight (19 assemblies): | |
| $UO_2$ | 160 lb. |
| Pu-Al | 70 lb. |
| Hanger weight | 40 lb. |
| Fuel assembly weight: | |
| $UO_2$ | 200 lb. |
| Pu-Al | 110 lb. |
| Maximum heat flux | 330,000 B.t.u./(hr.)(ft.$^2$). |

CONCENTRIC ASSEMBLIES

| | |
|---|---|
| Length of $UO_2$ in assembly | 7 ft. 4 in. |
| Length of assembly | 8 ft. 7 in. |
| Length of hanger | 5 ft. 10 in. |
| Length of fuel assembly (hanger and fuel assembly) | 14 ft. 5 in. |
| $UO_2$ diameters: | |
| Rod O.D. | 0.580 in. |
| Inner tube I.D. | 1.065 in. |
| Inner tube O.D. | 1.820 in. |
| Outer tube I.D. | 2.300 in. |
| Outer tube O.D. | 2.970 in. |
| Sheath material | Zircaloy-3. |
| Sheath thickness | 0.030 in. |
| $UO_2$ cross sectional area (total) | 4.74 in.$^2$. |
| Total cross sectional area | 5.57 in.$^2$. |
| $UO_2$ weight (10.2 g./cc.) | 154 lb. |
| Fuel assembly weight | 190 lb. |
| Hanger weight | 40 lb. |
| Fuel assembly weight | 230 lb. |
| Maximum heat flux | 400,000 B.t.u./(hr.)(ft.$^2$). |

Primary coolant system

| | |
|---|---|
| Heating load | 66 mw. |
| $D_2O$ flow rate | 8400 g.p.m. |

STEAM GENERATOR

| | |
|---|---|
| Type and number | 1–U tube and shell. |
| Total evaporation rate (full power) | 207,030 lb./hr. |
| $D_2O$ velocity | 14.5 ft./sec. |
| $D_2O$ pressure drop | 18 p.s.i. |

PUMPS

| | |
|---|---|
| Type and number | 3-shaft seal. |
| Spares in circuit | 1. |
| Operating head | 100 lb. |
| Capacity (each) | 4200 g.p.m. |

PRESSURIZER

| | |
|---|---|
| Pressurizing method | Helium bleed from H.P. tanks. |
| Pressurizer size | 109 ft.$^3$ $D_2O$. |
| Control pressure | 1050 p.s.i.g.$^2$. |

STEAM SYSTEM

| | |
|---|---|
| $H_2O$ flow | 535 g.p.m. |
| Steam drum pressure | 425 p.s.i.a. |

Moderator coolant system

| | |
|---|---|
| Heating load | 4 mw. |
| $D_2O$ flow rate | 1100 g.p.m. |
| $D_2O$ inventory | 2544 gal. |
| Temperature range | 137–160° F. |

HEAT EXCHANGERS

| | |
|---|---|
| Type and number | Countercurrent shell and tube. |
| Heat capacity | $13.7 \times 10^6$ B.t.u./hr. |

PUMPS

| | |
|---|---|
| Type and number | 3-shaft seal. |
| Spares | 1. |
| Oper. head | 100 p.s.i.g. |
| Capacity | 600 g.p.m. |
| Secondary cooling water, $H_2O$ flow rate | 750 g.p.m. at 68° F. inlet. |

Reactor controls

| | |
|---|---|
| Primary control | Moderator level. |
| Shim control | 18 units (36 half-rods). |
| Scram | Moderator dump. |

MODERATOR LEVEL CONTROL

| | |
|---|---|
| Method of level control | Helium balance system. |
| Moderator level, full power | 9.25 ft. maximum. 8.75 ft. minimum. |
| Controllable moderator height | 3 ft. to 9.25 ft. |
| Minimum rate of scram | Decrease 2 ft. in first second. |
| Sensitivity of level control | 0.1 in. |

SHIM CONTROL

| | |
|---|---|
| Number of shims | 36. |
| Material | Stainless steel. |
| Type construction | 18 pairs of half rods; rods individually driven by geared electrical motor drives. Units contained within calandria and top and bottom shields. |
| Poison strength | 36 mk. (1 mk. per half rod). |
| Max. rate of motion | 5 to 8 ft./min. |

Reactor core components

CALANDRIA

| | |
|---|---|
| Over-all length (top of vessel to bottom of vessel) | Outside 9 ft. 10½ in. |
| I.D. of moderator shell | 7 ft. 0 in. |
| Wall thickness of shell | ¼ in. |
| Over-all diameter of calandria including dump chamber | 11 ft. 0 in. |
| Material of construction | Aluminum. |
| Design pressure | 7.5 p.s.i.g. |
| Test pressure | 11.0 p.s.i.g. |
| Number of process channel shroud tubes | 85. |

| | |
|---|---|
| O.D. of process channel shroud tubes | 4.2 in. |
| Wall thickness of shroud tubes | .060 in. |
| Gas gap between shroud and process tubes | 0.303 in. |
| Number of flux monitor channels | 13. |
| O.D. of monitor channel tubes | 1.5 in. |
| Wall thickness of monitor channel tubes | 0.040 in. |
| Material of monitor channel tubes | Aluminum. |
| Number of shim control channels | 18. |
| O.D. of shim control channels | 2.6875 in. |
| Wall thickness of shim control channel tubes | 0.060 in. |
| Volume of heavy water in moderator | 284 ft.$^3$. |
| Bottom drain line | 8 in. |
| Top overflow line | 8 in. to 4 in. |

REFLECTOR

| | |
|---|---|
| Type of reflector used | Light water tank type. |
| Length of reflector (top and bottom) | 6 ft. 7¾ in. |
| Thickness of reflector | 23⅜ in. |
| Over-all diameter of outer reflector tank | 11 ft. 0 in. |
| Total metal thickness between inner reflector and moderator | ¼ in. of aluminum. |

*Shielding*

TOP AND BOTTOM SHIELDS (REMOVABLE)

| | |
|---|---|
| Weight: | |
| Of top shield | About 23 tons. |
| Of bottom shield | About 16 tons. |
| Thickness | 40 in. |
| Material | Iron pellets and about 37% water. |
| Density of mixture | 285 lb./cu. ft. minimum. |
| Neutron attenuation | About $10^6$. |

SIDE THERMAL SHIELDS (REMOVABLE)

| | |
|---|---|
| Thickness | 6 in. |
| Material | Iron. |
| Neutron attenuation | About $10^1$. |

SIDE BIOLOGICAL SHIELD

| | |
|---|---|
| Thickness | 71 in. |
| Material | Iron-limonite concrete. |
| Density | 265 lb./ft.$^3$ (minimum). |
| Neutron attenuation | About $10^{10}$. |
| Radiation level at outside of shield | <1 mrem./hr. |

SECONDARY TOP SHIELD

| | |
|---|---|
| Thickness | 27 in. |
| Material | Iron-loaded concrete. |
| Density | 320 lb./ft.$^3$ (minimum). |
| Weight of disks | 52, 14, 6, and 0.7 tons respectively. |
| Radiation level at main floor | ~5 mrem./hr. |

| Coolant Type | Top and Bottom Shield, Once-through water (treated) | Thermal, Side and Secondary Shield Once-through water (sanitary) |
|---|---|---|
| Quantity (total)__________g.p.m__ | 100 | 105 |
| Inlet temp. (max.)____________F__ | 145 | 70 |
| Outlet temp. (max.)___________F__ | 185 | 110 |

What is claimed is:

1. A fuel assembly for a pressurized water nuclear reactor to be suspended within a process tube in the active portion thereof from a perforated tube comprising a solid cylindrical element containing thermal neutron fissionable material, a first tubular element containing thermal neutron fissionable material concentrically surrounding and spaced from said solid element, a second tubular element containing thermal neutron fissionable material concentrically surrounding and spaced from said first tubular element, means for rigidly connecting the upper end of said first tubular element to said perforated tube, and means for rigidly supporting said solid element and said second tubular element at their lower ends to the lower end of said first tubular element whereby said elements are free to axially expand at different rates.

2. The fuel assembly of claim 1 wherein each of said elements comprises a core containing said thermal neutron fissionable material, and a neutron-permeable corrosion-resistant jacket cladding each of said cores, said jacket having a plurality of spaced ribs extending outwardly therefrom.

3. A fuel assembly for a pressurized water nuclear reactor to be suspended within a process tube in the active portion thereof from a perforated tube comprising a solid cylindrical element containing thermal neutron fissionable material, a first tubular element concentrically surrounding and spaced from said solid element, a second tubular element concentrically surrounding and spaced from said first tubular element, said first tubular element having a tubular extension at its upper end rigidly connected to said perforated tube, a support bracket having a pair of radially-opposite prongs welded to the lower end of said first tubular element and a second pair of radially-opposite prongs welded to the lower end of said second tubular element, a bolt connected to said support bracket and threadedly engaging the lower end of said solid element, a pair of radially-opposite, longitudinally-extending fins on said extension to said first tubular element, a tubular extension at the upper end of said second tubular element and having a pair of radially-opposite, longitudinally-extending slots adapted to receive said fins, said fins being slidable in either direction within said slots.

4. The fuel assembly of claim 3 wherein each of said elements comprises a core containing said thermal neutron fissionable material, and a neutron-permeable corrosion-resistant jacket cladding each of said cores, said jacket having a plurality of spaced ribs extending outwardly therefrom.

References Cited in the file of this patent

UNITED STATES PATENTS

| | | |
|---|---|---|
| 2,772,964 | Thomas | Dec. 4, 1956 |
| 2,841,545 | Zinn | July 1, 1958 |
| 2,848,404 | Treshow | Aug. 19, 1958 |
| 2,856,340 | Wigner et al. | Oct. 14, 1958 |
| 2,879,216 | Hurwitz et al. | Mar. 24, 1959 |
| 2,890,158 | Ohlinger et al. | June 9, 1959 |

OTHER REFERENCES

"Westinghouse Engineer," September 1956, pp. 138–142. (Copy in Library.)

Nucleonics, November 1956, pp. 138–144. Copy in Library.